March 7, 1944.  F. E. ALTMAN  2,343,629

LENS

Filed May 11, 1942  2 Sheets-Sheet 1

FIG. 1

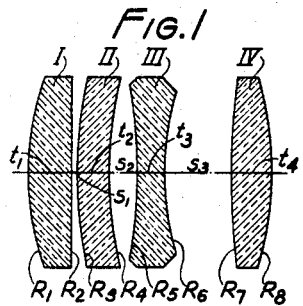

FIG. 2

| EXAMPLE: 1 | f/3.5 | f = 100 mm. | B.F. = 81.2 mm. |
|---|---|---|---|
| LENS | $N_D$ | V | RADII | THICKNESSES |
| I | 1.611 | 57.2 | $R_1 = +\ 36.0$ mm.<br>$R_2 = \infty$ | $t_1 = 5.8$ mm.<br>$s_1 = 0.65$ mm. |
| II | 1.617 | 36.6 | $R_3 = +\ 57.2$ mm.<br>$R_4 = +\ 51.8$ mm. | $t_2 = 4.3$ mm.<br>$s_2 = 3.70$ mm. |
| III | 1.617 | 36.6 | $R_5 = -\ 62.5$ mm.<br>$R_6 = +\ 36.0$ mm. | $t_3 = 3.64$ mm.<br>$s_3 = 8.88$ mm. |
| IV | 1.611 | 57.2 | $R_7 = +130.3$ mm.<br>$R_8 = -\ 47.6$ mm. | $t_4 = 5.3$ mm.<br>$T = 32.27$ mm. |

FIG. 3

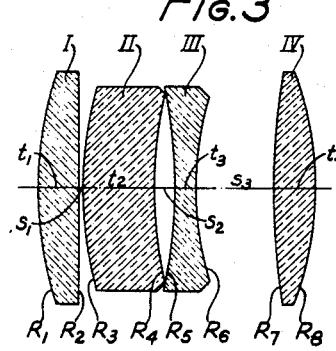

FIG. 4

| EXAMPLE: 2 | f/3.5 | f = 100 mm. | B.F. = 80.4 mm. |
|---|---|---|---|
| LENS | $N_D$ | V | RADII | THICKNESSES |
| I | 1.611 | 57.2 | $R_1 = +\ 50.30$ mm.<br>$R_2 = \infty$ | $t_1 = 5.50$ mm.<br>$s_1 = 0.50$ mm. |
| II | 1.605 | 38.0 | $R_3 = +\ 50.0$ mm.<br>$R_4 = +\ 57.20$ mm. | $t_2 = 9.50$ mm.<br>$s_2 = 2.8$ mm. |
| III | 1.649 | 33.8 | $R_5 = -\ 65.74$ mm.<br>$R_6 = +\ 42.04$ mm. | $t_3 = 3.0$ mm.<br>$s_3 = 10.15$ mm. |
| IV | 1.620 | 60.2 | $R_7 = +176.60$ mm.<br>$R_8 = -\ 43.84$ mm. | $t_4 = 5.6$ mm.<br>$T = 37.05$ mm. |

Fred E. Altman
INVENTOR

BY
ATTY. & AG'T.

March 7, 1944.  F. E. ALTMAN  2,343,629
LENS
Filed May 11, 1942  2 Sheets-Sheet 2
FIG. 5
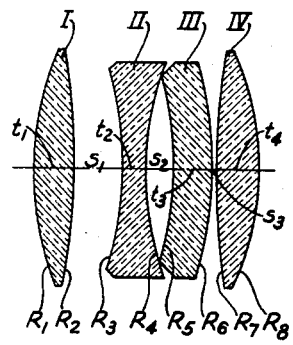
FIG. 6
| EXAMPLE: 3 | | f/3.5 | f = 100 mm. | B.F.= 93.2 mm. |
|---|---|---|---|---|
| LENS | $N_D$ | V | RADII | THICKNESSES |
| I | 1.607 | 49.2 | $R_1$ = + 40.40 mm.<br>$R_2$ = −240.0 mm. | $t_1$ = 5.5 mm.<br>$s_1$ = 6.5 mm. |
| II | 1.675 | 34.6 | $R_3$ = − 45.83 mm.<br>$R_4$ = + 43.78 mm. | $t_2$ = 3.0 mm.<br>$s_2$ = 3.75 mm. |
| III | 1.585 | 57.4 | $R_5$ = − 44.15 mm.<br>$R_6$ = − 50.0 mm. | $t_3$ = 5.25 mm.<br>$s_3$ = 0.5 mm. |
| IV | 1.626 | 58.2 | $R_7$ = + 315.00 mm.<br>$R_8$ = − 36.80 mm. | $t_4$ = 5.5 mm.<br>$T$ = 30.0 mm. |
FIG. 7
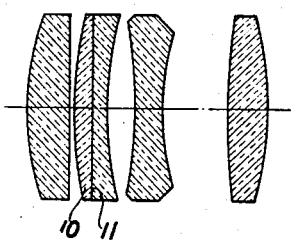
FRED E. ALTMAN
INVENTOR
BY
ATTY.&AG'T.

Patented Mar. 7, 1944

2,343,629

UNITED STATES PATENT OFFICE 2,343,629

LENS

Fred E. Altman, Rochester, N. Y., assignor to Eastman Kodak Company, Rochester, N. Y., a corporation of New Jersey Application May 11, 1942, Serial No. 442,421

15 Claims. (Cl. 88—57)

This invention relates to photographic objectives, and particularly to that type known as the modified triplet in which one of the components is modified by dividing it into two components enclosing an air lens.

The object of the invention is to provide a rapid and comparatively inexpensive photographic objective with all the usual aberration corrections and with reduced astigmatism over a wide angle of field.

There have been a number of modified triplets made heretofore which have had good corrections over a large aperture, even as large as f/2.0, and which have been developed from the triplet type by replacing one of the positive components by two positive components separated by an air lens. This design in general has served to reduce the zonal spherical aberration, but has not notably extended the angular field.

According to the present invention, the negative component is replaced by two components. Although the resulting lens is superficially similar to the previous modifications, the effects are quite different and a comparison discloses many distinguishing structural features. One of these two components is a negative biconcave component so constructed and positioned that the surface facing the front of the objective has a radius of curvature between 0.8 and 2.0 times the radius of curvature of the surface facing the rear of the objective. The other is a meniscus component with a thickness greater than 0.02F where F is the focal length of the objective and with its concave side facing the biconcave component. The meniscus may be negative, afocal, or even very weakly positive in power, but not strongly positive as in the prior modified triplets referred to above. The useful range of powers is from —2.0 through zero to +0.3 times the power of the objective, the power of the component being taken as the algebraic sum of the powers of the individual surfaces.

This arrangement is valuable in increasing the useful angle of field of objectives of large aperture.

In the course of designing an f/3.5 triplet to cover upwards of 27° from the axis, a stage was reached in which all the corrections were satisfactorily made except that for spherical aberration. No matter what bendings were made, if the field characteristics remained satisfactory, the spherical aberration remained overcorrected. This will be recognized by those skilled in the art as being the situation in which the shape of the negative component is not far from the shape of minimum effect on the aberration and its radii are more nearly equal than in the majority of triplets, and it was found to be important to retain this general shape in the invention.

A higher index flint glass in the dispersive component would carry with it a higher dispersion calling for weaker radii and longer air spaces, all of which would contribute to a good aberration condition, but these same factors would tend to render the field less flat and the added length would render the tangential field more inward curving at large obliquities.

In general, a short over all length is a factor in reducing the astigmatism over a large angular field, but at the same time it tends to overcorrection of the spherical aberration both because of larger diameter of the axial pencil of rays as they strike the negative component and because of the stronger curves which are necessary to obtain a small Petzval sum.

These difficulties were overcome by dividing the negative component into two components as described above. When the meniscus component is placed in front of the biconcave component and is given a negative power, a two fold effect is produced. First the meniscus shape with considerable thickness has the effect of shifting the zonal and marginal aberration rays toward the axis, even though the lens itself produces little change in the direction of the rays. Second the curves of the biconcave component are weaker on account of the shifting of some of the negative power to the meniscus component. These rays therefore now strike a negative lens with somewhat reduced curvatures, also they strike somewhat closer to the axis with the result that the corrective effect is lessened.

A very favorable effect is produced, not only in reducing the overcorrection of the spherical aberration of the axial pencil, but oblique pencils are similarly benefited with the result that the so-called rim rays are corrected to a high degree, and this system is further characterized in that this high state of correction of the oblique pencil is stable for the various obliquities. This is a distinct advantage over those objectives previously known in which the rim rays for some one obliquity are corrected by strongly curved cemented surfaces which produce a correction that is not stable for the various obliquities. A further advantage lies in the cheapness of manufacture. Whereas a strongly curved cemented surface requires two strong surfaces to be ground and polished and then cemented together, the present invention requires surfaces but slightly if any stronger than those already present in the three component lens without the features of this invention. It is well known that the stronger surfaces are more expensive to manufacture. The present invention may, however, be used in combination with cemented surfaces to produce a more highly corrected objective than by either method alone.

It appears that the invention is a means of combining the advantages of a short over all length in regard to the field with the advantages of a longer over all length in regard to the aberration, in that the meniscus component produces at the strong negative component, the small diameter of the axial pencil of rays which small diameter is also found advantageously in triplet objectives with comparatively long over all length.

After completing a design in which the meniscus component was dispersive in effect, a further study was made and it was found that the objects of the invention could be attained by using a thick meniscus component with zero or even slightly positive power. In fact, the effect of the thick meniscus even counteracting a small change in the opposite direction in the power of the biconcave component. The useful range of powers was found to be from −2.0 to +0.3 times the power of the objective.

A further investigation showed that the meniscus component can also be placed behind the biconcave component instead of in front of it. In this position the meniscus component can hardly be said to compress the axial pencil of rays before it strikes the biconcave component, but it has the analogous effect of expanding this pencil of rays before it strikes the rear positive component. Thus the same end is attained by increasing the contribution of the latter component toward undercorrected spherical aberration.

Also in this position the meniscus component has the effect of tending to increase the back focal length in comparison with the equivalent focal length, and this of itself is helpful in covering a wider field by tending to increase the distance from the exit pupil of the objective to the focal plane thus decreasing the angle subtended at the exit pupil by a given angle of field.

It is preferred that the axial distance between the meniscus and the biconcave components be less than the distance between the biconcave component and the positive component situated on the opposite side of the biconcave component from the meniscus component. This relationship aids in a better correction of the astigmatism over a wide angle of field and also in correcting the distortion.

It is also preferred that the shape of the meniscus component be such that the radius of curvature of its concave surface be between 0.2F and 0.8F where F is the focal length of the objective. If this radius is shorter it is more expensive to manufacture, while if it is longer the displacement of the aberration rays already described is not great enough to be sufficiently effective.

A very high index flint glass in the biconcave component tends to render the field less flat in the same manner as already described as occurring in simple triplets. This index is regarded as "high" or "low" in reference to the indices of the other components, or more specifically in reference to the front positive component. Accordingly in a preferred form of the invention the refractive index of the biconcave component is less than the refractive index of the front positive component plus 0.05 or preferably 0.02. Since there is no reason except increased cost for not compounding some of the components of the invention it is pointed out to avoid ambiguity that the index of the strongest element whose sign is the same as the whole component is taken for the purpose of this comparison. Stated exactly, the condition for this preferred improvement is that the refractive index of the strongest negative element in the biconcave component (it is usually the only one) is less than $N_1$ plus 0.05 preferably less than $N_1$ plus 0.02 where $N_1$ is the refractive index of the strongest positive element of the front component (this too is usually the only one).

In order to reduce the astigmatism over a wide angle of field it is preferable that the objective be comparatively short. In one embodiment of the invention the over all length of the lens is between $\frac{1}{4}F$ and $\frac{5}{11}F$. "Over all length" has the usual meaning, namely, the sum of all the axial lens thicknesses plus all the intervening airspaces. A length of at least $\frac{1}{4}F$ is required in order to make a well corrected lens of this type with an aperture as large as F/4.5. In another embodiment of the invention the advantages of a short over all length are secured by so constructing the lens that the sum of the three air spaces in the objective is less than $\frac{3}{8}F$ although the thicknesses of the components may be great enough to make the overall length greater than $\frac{5}{11}F$. The addition of a millimeter of glass thickness does not have as great an effect on the field as does a millimeter of air space.

In the accompanying drawings:

Fig. 1 shows an objective according to the invention in which the meniscus component has negative power.

Fig. 2 gives the data for Fig. 1.

Fig. 3 shows an objective at which the meniscus component has very slight positive power.

Fig. 4 gives the data for Fig. 3.

Fig. 5 shows another form of the invention in which the meniscus component is positioned behind the biconcave component.

Fig. 6 gives the data for Fig. 5.

Fig. 7 shows a modification of Fig. 1.

The constructional data for one lens of each of these types are given below:

Example 1 f/3.5        EF=100 mm.

| Lens | $N_D$ | V | Radii | Thickness |
|---|---|---|---|---|
| I | 1.611 | 57.2 | $R_1=+36.0$ mm.<br>$R_2=\infty$ | $t_1=5.8$ mm.<br>$S_1=0.7$ |
| II | 1.617 | 36.6 | $R_3=+57.2$<br>$R_4=51.8$ | $t_2=4.3$<br>$S_2=3.7$ |
| III | 1.617 | 36.6 | $R_5=-62.5$<br>$R_6=+36.0$ | $t_3=3.6$<br>$S_3=8.9$ |
| IV | 1.611 | 57.2 | $R_7=+130.3$<br>$R_8=-47.6$ | $t_4=5.3$<br>B. F.=81.2 |

Example 2 f/3.5        EF=100 mm.

| Lens | $N_D$ | V | Radii | Thicknesses |
|---|---|---|---|---|
| I | 1.611 | 57.2 | $R_1=+50.3$ mm.<br>$R_2=\infty$ | $t_1=5.5$ mm.<br>$S_1=0.5$ |
| II | 1.605 | 38.0 | $R_3=+50.0$<br>$R_4=+57.2$ | $t_2=9.5$<br>$S_2=2.8$ |
| III | 1.649 | 33.8 | $R_5=-65.7$<br>$R_6=+42.0$ | $T_3=3.0$<br>$S_3=10.15$ |
| IV | 1.620 | 60.2 | $R_7=+176.6$<br>$R_8=-43.8$ | $t_4=5.6$<br>B. F.=80.4 |

Example 3 f/3.5        EF=100 mm.

| Lens | $N_D$ | V | Radii | Thicknesses |
|---|---|---|---|---|
| I | 1.607 | 49.2 | $R_1=+40.4$ mm.<br>$R_2=-240.0$ | $t_1=5.5$ mm.<br>$S_1=6.5$ |
| II | 1.650 | 34.6 | $R_3=-45.8$<br>$R_4=+43.8$ | $t_2=3.0$<br>$S_2=3.75$ |
| III | 1.572 | 57.4 | $R_5=-44.15$<br>$R_6=-50.0$ | $t_3=5.25$<br>$S_3=0.5$ |
| IV | 1.613 | 58.2 | $R_7=+315.0$<br>$R_8=-36.8$ | $t_4=5.5$<br>B. F.=93.2 |

The data for Fig. 7 is the same as for Fig. 1. In Fig. 7 however, the meniscus component 10 is split and recemented to include a cemented plano surface 11. This is useful in overcoming the difficulty of assembling and centering low power meniscus elements. With this provision the parts of the component may be centered separately and then mounted. The cemented surface has no optical effect as long as the glass on both sides thereof is the same.

It will be noted that the following characteristics are found in all three of these examples: The over all length is between ¼F and 5/11F, being 0.323F, 0.370F, and 0.300F respectively. The sum of the airspaces is less than ⅜F in each case. In the respective biconcave components the radius of curvature of the front surface is between 0.8 and 2.0 times than that of the rear surface, this ratio being 1.73, 1.56, and 1.04 in the respective examples. Also the refractive index of this component for the D line of the spectrum is not larger than the sum of the index of the front positive component plus 0.05. In the respective meniscus components the algebraic sum of the two surface powers lies between −2.0 and +0.3 times the power of the whole objective, this sum being −0.11, +0.15, and −0.15 in the respective examples. The thickness of this component is greater than 0.02F in each case, and the radius of curvature of its concave surface lies between 0.2F and 0.8F. Lastly, the biconcave component is spaced closer to the meniscus component on one side than to the positive component on the other.

The index of refraction of the biconcave component is less than the sum of the index of the front positive component plus 0.02 in Examples 1 and 3, but is greater than this sum in Example 2.

In Example 3, in which the meniscus component follows the biconcave component, the back focus is somewhat longer. This is considered an advantage in mounting in some camera bodies where a greater working space is desirable between the objective and the focal plane. Moreover, this type was found to have an improved zonal sagittal field curvature.

Although in the examples shown each component consists of a single lens element, the invention is not limited to this structure but is of the scope of the appended claims in which the word "component" is to be understood in its usual sense as meaning either a single lens element or two or more lens elements cemented together.

What I claim is:

1. A photographic objective with an over all length greater than ¼ of its focal length comprising a front and a rear positive component and axially aligned between them a biconcave component and a meniscus component with its concave side facing the biconcave component in which the meniscus component is so constructed that its thickness is greater than one-fiftieth of the focal length of the objective and the algebraic sum of its surface powers is algebraicly less than plus three-tenths and greater than minus two times the power of the objective and in which the biconcave component is so constructed and disposed that the radius of curvature of the side turned toward the front of the objective is more than eight-tenths and less than two times the radius of curvature of the side turned away from the front of the objective.

2. An objective according to claim 1 in which the axial distance between the meniscus and the biconcave components is less than the distance between the biconcave component and the positive component situated on the opposite side from the meniscus component.

3. An objective according to claim 1 in which the radius of curvature of the concave face of the meniscus component is between one-fifth and four-fifths of the focal length of the objective.

4. An objective according to claim 1 in which the index of refraction of the strongest negative element in the biconcave component is less than the sum of $N_1$ plus 0.05 where $N_1$ is the index of refraction of the strongest positive element in the front positive component, and in which the biconcave component is axially spaced closer to the meniscus component on one side than to the positive component on the other side.

5. An objective according to claim 1 in which the over all length is less than five-elevenths of the focal length.

6. An objective according to claim 1 in which the over all length is less than five-elevenths of the focal length and the concave radius of the meniscus component is between one-fifth and four-fifths of the focal length of the objective.

7. An objective according to claim 1 in which the sum of the air spaces between the components is less than three-eighths of the focal length of the objective.

8. An objective according to claim 1 in which the refractive index of the strongest negative element in the biconcave component is less than the sum of $N_1$ plus 0.02 where $N_1$ is the refractive index of the strongest positive element in the front positive component.

9. An objective according to claim 1 in which the refractive index of the strongest negative element in the biconcave component is less than the sum of $N_1$ plus 0.02 where $N_1$ is the refractive index of the strongest positive element in the front positive component, the sum of the airspaces between the components is less than three-eighths of the focal length of the objective, and the biconcave component is axially spaced closer to the meniscus component on one side than to the positive component on the other side.

10. An objective according to claim 1 in which the refractive index of the strongest negative element in the biconcave component is less than $N_1$ plus 0.05 where $N_1$ is the refractive index of the strongest positive element in the front positive component, the concave radius of the meniscus component is between 0.2F and 0.8F where F is the focal length of the objective, the over all length is less than 5/11F, and the biconcave component is axially spaced closer to the meniscus component on one side than to the positive component on the other side.

11. An objective according to claim 1 in which the meniscus component is in front of the biconcave component.

12. An objective according to claim 1 in which the meniscus component is negative in power.

13. An objective according to claim 1 in which the meniscus component is behind the biconcave component.

14. An objective according to claim 1 in which the meniscus component is very slightly positive in power.

15. An objective according to claim 1 in which the meniscus component includes a plano cemented surface for convenience in assembly.

FRED E. ALTMAN.